June 16, 1959 P. G. HANSEL 2,891,157

FREQUENCY CONTROL MEANS

Filed Nov. 24, 1952

INVENTOR
PAUL G. HANSEL
BY Mitchell & Bechert
ATTORNEYS

United States Patent Office 2,891,157

Patented June 16, 1959

2,891,157

FREQUENCY CONTROL MEANS

Paul G. Hansel, Greenvale, N.Y., assignor to Servo Corporation of America, New Hyde Park, N.Y., a corporation of New York Application November 24, 1952, Serial No. 322,301

5 Claims. (Cl. 250—36)

My invention relates to frequency-stabilizing means having particular application to radio transmitters, and this application is a continuation-in-part of certain elements divided out from my co-pending patent application, Serial No. 238,257, filed July 24, 1951.

The present highly developed art of transmitter design depends upon the piezo resonator as the source of frequency stability. The output of a piezo resonator is relatively weak, and therefore conventional transmitters are characterized by numerous amplifier stages for increasing the power level to that required for transmission. For normal requirements, such multi-stage transmitters are perfectly adequate, and their characteristics are well known. However, when the transmitter is to be available for assignment to any one of a large number of channels with closely spaced carrier frequencies, separate multi-stage transmitters must be provided if conventional practice is to be followed. Where the number of channels is of the order of three or four, the problem is not insurmountable; but, when a greatly increased number of channels is to be available, overwhelming complexity results from conventional transmitter practice.

It is, accordingly, an object of the invention to provide improved frequency-stabilizing means.

It is another object to provide an improved transmitter with automatic frequency-stabilizing means which may stabilize at any selected one of a relatively large number of desired operating frequencies.

A further object is to provide in conjunction with improved frequency-selecting means, means for automatically indicating by way of confirmation that a desired one of a relatively large plurality of available frequencies has been properly selected so that one may monitor the operation of the frequency-selecting means.

Still another object is to provide an improved multiple-frequency reference-frequency source with a transmitter incorporating improved means for automatic stabilization at any selected one of the reference frequencies.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Briefly stated, my invention contemplates an improved transmitter in which radio-frequency energy of the desired power level and nominal frequency is generated in a power oscillator which may be coupled directly to the radiating antenna. The power oscillator may be designed for maximum efficiency but not necessarily for maximum frequency stability. A small amount of the output of the oscillator may be mixed in a comparator circuit with the output of a reference-signal generator to derive an error signal proportional to the difference between the reference frequency and the output frequency of the transmitter. The error signal thus derived may be used to actuate a transducer in an inverse-feedback loop to correct the frequency of the power oscillator. A relatively small quantity of the output energy to the antenna may be tapped through attenuator means and fed to means for analyzing the output frequency, and there may thus be available a means for checking to determine whether the selected frequency is in fact the operating frequency.

Figure 1:
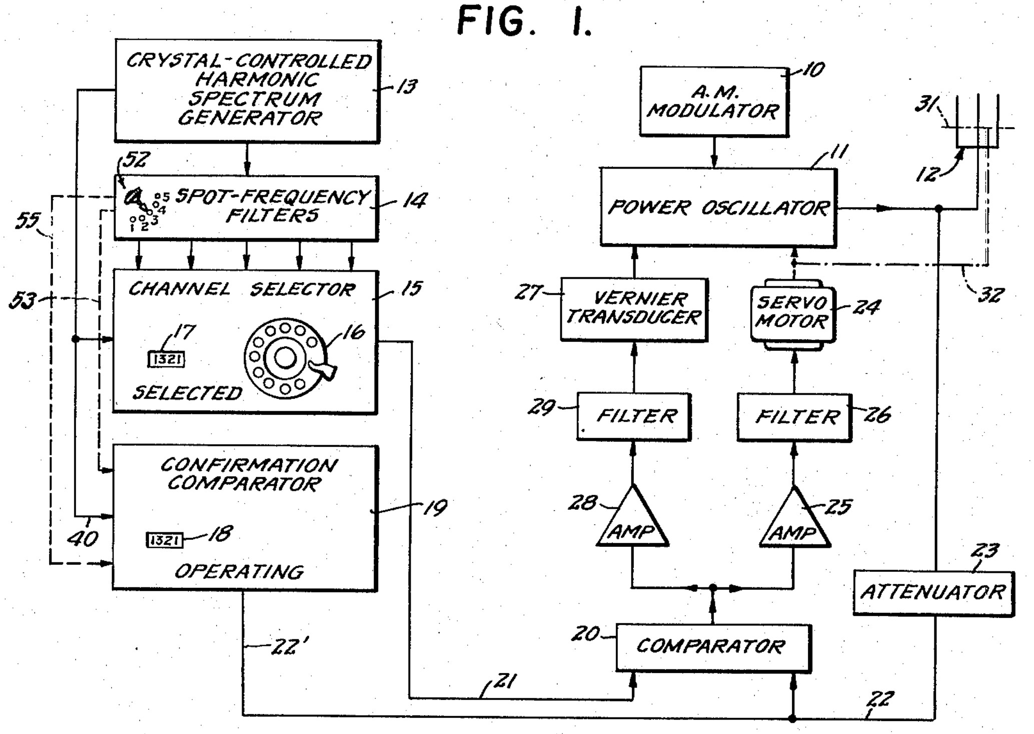
Fig. 1 is a block diagram schematically illustrating a radio transmitter incorporating features of the invention.

Referring to Fig. 1 of the drawings, my invention is shown in application to a multi-channel radio transmitter in which a large number (say, in the thousands) of different carrier frequencies is to be available for selection as the carrier over which intelligence, introduced at modulator means 10, is to be transmitted. The transmitter may comprise essentially a relatively simple power oscillator 11 which may include a high-power self-excited class "C" amplifier. The tuning range of oscillator 11 may cover a relatively wide band, as for example from 225 to 400 mc./s. The oscillator 11 may thus comprise a single stage directly coupled to antenna means 12.

The reference oscillator or source of reference frequencies may comprise a single crystal oscillator, a plurality of crystal oscillators, or a spectrum generator, and in Fig. 1 I illustrate the latter case. Spectrum generators of the character herein contemplated have been described in greater detail in my copending patent application, Serial No. 200,060, filed December 9, 1950; therefore, the present showing is somewhat abbreviated. Suffice it to say that a spectrum generator 13 may derive from a single crystal-controlled oscillator a vast spectrum of harmonic frequencies, each of which may reflect the inherent stability of the basic crystal frequency. Spot-frequency filters 14 may serve to establish "mile posts" at given spacings throughout the harmonic spectrum of generator 13, and channel-selector means 15 may include manual-selection means, such as a dial 16, for use when calling for a change in channel selection. The channel selector 15 is shown to include a display window 17 to indicate which channel has been selected; and the corresponding window 18 of a confirmation comparator 19 displays an indication of the channel which, at any particular time, is actually determining the frequency of power oscillator 11. The confirmation comparator 19 will be described in greater detail below.

In accordance with the invention, I employ frequency-comparator means 20 to respond to the frequency difference between a selected reference-source frequency (appearing in the line 21) and the instantaneous oscillator-output frequency (appearing in the line 22). Attenuator means 23 may be connected directly to the output of the power oscillator and may serve the function of bleeding a token fraction of the available energy for supplying to the comparator 20. The comparator 20 will be described below in connection with Fig. 2, but it will suffice to say that the comparator may yield error signals proportional in magnitude and phase to the instantaneous frequency difference between signals appearing in lines 21—22. The comparator 20 may thus drive appropriate transducer means for corrective frequency control of the oscillator 11.

I prefer that the transducer means responding to the comparator 20 shall include at least two elements: first, a relatively long-time-constant coarse-tuning means for the oscillator 11, and, second, a relatively short-time-constant fine-tuning (vernier tuning) means for the oscillator 11. For coarse tuning, I have shown a servo motor 24 driven by appropriate amplifier and filter means 25—26. It will be understood that the servo motor 24 may mechanically drive a variable tank-circuit capacitor in the final stage of the power oscillator 11. Ordinarily, the relatively long time constant of the coarse-tuning mechanism will limit its use only to the relatively large movements called for when channels are being changed, as after an operation of the dial 16.

The vernier-transducer means 27 may serve for fine-tuning adjustments and therefore for rapid frequency stabilization in the oscillator 11, as slaved to a particular selected reference frequency appearing in line 21. The transducer means 27 has been disclosed in greater detail in the said copending patent application, Serial No. 238,257, and will therefore not be described herein in further detail.

Ordinarily, the antenna means 12 will be designed to handle sufficient radiated power for any selected one of a plurality of channel frequencies. However, if the utmost in radiated power is demanded, then, in accordance with the invention, I provide relatively simple means for adjusting the antenna means 12 for a proper match to the oscillator 11 and for maximum radiation of power. In Fig. 1, such means is schematically shown by a movable member 31 mechanically connected by means 32 to the output of servo motor 24. Thus, it will be understood that, with each change in channel selection, not only may the frequency of power oscillator 11 be quickly shifted, but the antenna may also be automatically matched for optimum radiation at the changed frequency.

Figure 2:
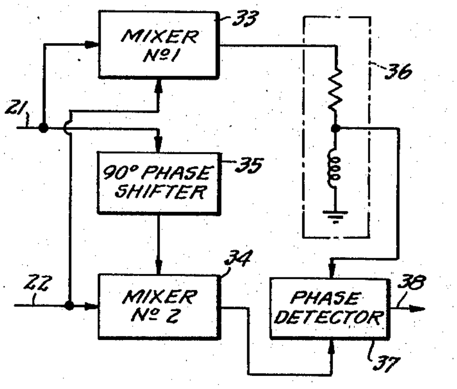
Fig. 2 is a block diagram illustrating in greater detail certain components of one of the elements of Fig. 1.

In Fig. 2, I illustrate relatively simple means for the internal construction of the frequency comparator 20. As will be seen from the labels on the blocks in Fig. 2, the method of operation of the comparator 20 comprises a first and direct mixing at 33 of the reference-signal frequency and the oscillator-output frequency. At the same time, these same two frequencies are mixed in a second mixer 34, but with a quadrature relative phase shift, as introduced at 35. One of the mixed outputs is differentiated, as by means 36, and discrimination between the differentiated output of one mixer and the untreated output of the other mixer takes place in a phase detector 37. The phase-detector output at 38 may directly control the transducer means through appropriate amplifying and filter circuits, as shown in Fig. 1.

In order to more fully to understand the operation of the circuit of Fig. 2, it may be helpful to consider a theoretical approach; such an approach is given in the said copending application, Serial No. 238,257. In the practical design of a frequency comparator of the character described, it may be useful to follow the funnel-discriminator concept in order to achieve high resolution near the zero-beat frequency and a wide pull-in range away from the beat frequency. This can be accomplished by choice of parameters in the differentiating circuits and in the phase detector.

Figure 3:
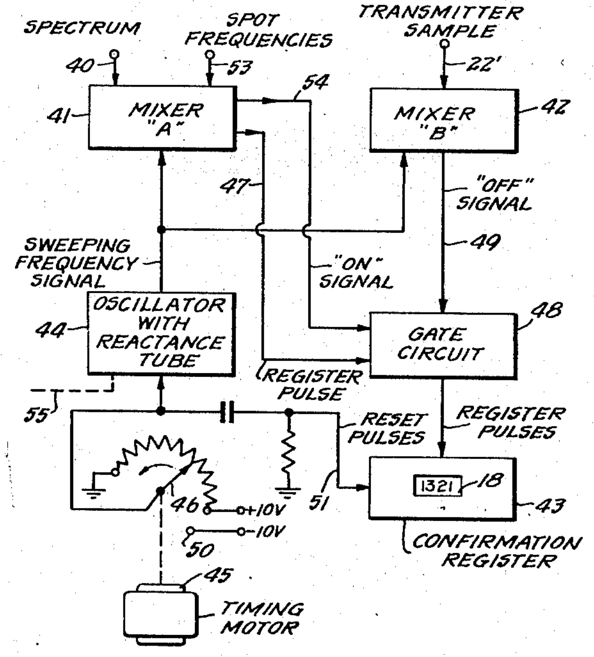
Fig. 3 is another block diagram illustrating components of a further element of Fig. 1.

In Fig. 3, I illustrate specific means for implementing the confirmation comparator 19. As indicated generally above, this comparator operates primarily from energy bled in line 22 from the output of the power oscillator 11; this energy is shown available in line 22', directly feeding the comparator 19. In order to establish a basis for evaluating the frequency of signals in line 22, the comparator may receive in line 40 the entire spectrum of harmonics developed by generator 13. The spectrum frequencies are shown supplied directly to first mixer 41, labeled Mixer "A," and the sample available directly from the transmitter is shown fed directly to a second mixer 42, labeled Mixer "B."

The evaluated frequency may be directly read at window 18 of a confirmation register 43, which may be a mechanically indexed indicator, indexing one count for every register pulse developed in the comparator. In order to develop register pulses, I feed Mixer "A" with the output of a periodically sweeping tuned oscillator 44, which may include a reactance tube governed by the drive provided by a timing motor 45. Reactance-tube performance may be controlled by a sweeping low-voltage input signal, available from the continuously driven arm of a potentiometer 46 coupled to motor 45. The output frequency of oscillator 44 preferably spans a range of frequencies including all those at which it may ever be desired to operate the transmitter; therefore any one sweeping period will be characterized by coincidences of frequencies with the desired harmonic frequencies in the spectrum available from generator 13. Register pulses will then be generated by Mixer "A" in line 47, once for each frequency coincidence, and as the sweeping frequency signal passes each one of the harmonics in the spectrum. The register pulses are shown fed first to a gate circuit 48 and then to the confirmation register 43.

The sweeping frequency signal may also be fed directly to Mixer "B," and since there is only one frequency (i.e. the transmitter carrier frequency) available for coincidence in Mixer "B," only one coincidence signal will be generated in line 49 for each sweeping cycle. This coincidence signal may be used for determining a limit of gate-circuit operation, as for example for terminating gate-circuit operation.

With the described circuit it will be seen that the sweeping-frequency signal will cause a succession of register pulses for each sweeping cycle. These register pulses may be fed directly to the confirmation register so as to provide indexed indications until such time as a frequency coincidence in Mixer "B" determines that the gate circuit 48 shall terminate the counting of register pulses. The sweeping mechanism will continue to sweep the full range of frequencies, but gate circuit 48 will prevent the tallying of register pulses, so that the indication at window 18 may remain steady and for observation until the next sweeping cycle is begun. At the commencement of the next sweeping cycle, the contact arm of potentiometer 46 may strike a terminal 50 carrying a sufficiently distinctive biasing signal to apply a reset pulse in line 51 to the confirmation register 43. Reset pulses of this nature will be understood completely to nullify the previous indication at window 18 so that the first register pulses of the next succeeding frequency sweep may commence from a predetermined indicated number, which may be zero, or any other number.

Most often the operator has a general idea of the operating frequency of his equipment, and there is no need to proceed through a relatively long sweeping cycle in order to identify the transmitting frequency. Therefore, in accordance with the invention, I provide, as an element in filtering means 14, a means 52 for manually selecting any one of a plurality of spot-frequency filters, so that a particular spot frequency may be available in line 53 to Mixer "A." The spot frequencies may be chosen for relatively equal spacing in the total range of frequencies from which the operating frequency is to be selectable, and of course the bands passed by the spot-frequency filters should be narrow enough to provide unambiguous identification of the desired particular harmonic in the spectrum.

Mixer "A" may thus be understood to include means responsive to the selected spot frequency (available in line 53) for causing Mixer "A" effectively to ignore spectrum frequencies below the selected spot frequency. Therefore, for each frequency-sweeping cycle, no register pulses will be available in line 47 until attainment of the selected spot frequency. Having selected a particular spot frequency at 52, the confirmation register may be interpreted as by reading a count, beginning at the selected spot frequency (and, therefore, to be added to the selected spot frequency itself).

Alternatively, Mixer "A" may still respond to the entire spectrum of harmonics available in line 40 and merely additionally respond in line 54 to the selected spot frequency so as to supply in line 54 one impulse per sweeping cycle for opening the gate circuit 48. In the latter case, therefore, the function of ignoring spectrum frequencies below the selected spot frequency will have been relegated to the gate circuit 48, and register pulses will be passed to the confirmation register 43 only, beginning with the "on" signal supplied by line 54 and terminating with the "off" signal supplied in line 49.

I have thus far described the sweeping means 44—45—46 in such a manner that no matter what the spot-frequency selection, the potentiometer 46 or other sweeping means will be caused to sweep throughout the full sweeping span for every sweeping cycle. However, for the confirmation register to discriminate between successive register pulses, this limitation on the frequency-sweeping means may mean too large a sweeping cycle for some applications. In order to avoid this limitation, I provide means suggested by the phantom line input 55 to oscillator 44, and responsive to the manual selection at 52, for changing the basic constants of the oscillator operation; thus, with selection at 52 of a particular spot frequency, a tuning element such as a capacitor in the tank circuit of oscillator 44 may have been mechanically shifted so as to determine a particular limiting frequency with respect to which the sweep frequencies (caused by potentiometer 46 on the reactance tube) may vary. For any one spot-frequency selection, the spread of frequency sweeping may extend from the selected frequency and up to another frequency, as for example just beyond that selectable at the next selection point in the filtering means 14. For every sweeping cycle, therefore, register pulses will be available in line 47 only over the relatively restricted sweeping band, and the gate circuit will function as previously described in response to "on" and "off" triggering pulses to determine basic information available to the confirmation register for developing the frequency indication.

It will be seen that I have described a relatively simple transmitter that may be accurately frequency-stabilized and which may at the same time be designed for high-efficiency operation. My construction very substantially eliminates the numerous amplification stages that are ordinarily required and lends itself to operation on any selected one of a large number of carrier frequencies. The equipment's relative simplicity may substantially reduce trouble-shooting and maintenance problems, and my confirmation comparator circuit may provide for continuously checking to assure operation at the instantaneously desired frequency.

While I have described my invention in detail for the preferred form shown, it will be understood that modifications may be made within the scope of the invention as defined in the appended claims.

I claim:

1. Transmitter means, comprising a radio-frequency oscillator, a reference-frequency source, automatic tuning means for said oscillator including frequency-comparator means responsive to the frequency difference in outputs of said oscillator and of said source; said reference-frequency source comprising a crystal-controlled harmonic-spectrum generator, channel-selector means for selecting a particular harmonic frequency in the generator output, whereby through operation of said channel-selector means said frequency-comparator means is effective to control the tuning of said oscillator in accordance with the selected harmonic frequency of said generator, said channel-selector means including an indicator whereby the selected frequency or channel number may be identified, and confirmation-comparator means responsive to the output of said oscillator and to the output of said spectrum generator and including an indicator of the actual transmitter operating frequency or channel number.

2. Transmitter means, comprising a radio-frequency oscillator, a reference-frequency source, automatic tuning means for said oscillator including frequency-comparator means responsive to the frequency difference in outputs of said oscillator and of said source; said reference-frequency source comprising a harmonic-spectrum generator, channel-selector means for selecting a particular harmonic frequency in the generator output, whereby through operation of said channel-selector means said frequency-comparator means is effective to control the tuning of said oscillator in accordance with the selected harmonic frequency of said generator, and confirmation-comparator means responsive to the output of said oscillator and to the output of said spectrum generator, said confirmation comparator means including a frequency-sweeping oscillator sweeping periodically between frequency limits encompassing a band in said spectrum and including the expected output frequency of said oscillator, means for mixing the frequency-sweeping signal with frequencies in said spectrum and with the frequency of said transmitter, whereby a pulse may be generated for each frequency coincidence between the frequency-sweeping signal and a frequency in said spectrum and between the frequency-sweeping signal and the transmitter frequency, and indicating means responsive separately to frequency coincidences with the spectrum and to a frequency coincidence with the transmitter signal for indicating a count determined by the transmitter signal.

3. Oscillator means including tuning means therefor, a reference-frequency source, frequency-comparator means responsive to the output of said oscillator means and to the output of said source and in controlling relation with said tuning means; said source comprising a generator of a spectrum of frequencies, automatic frequency-sweeping means variable through a range of frequencies in said spectrum, whereby a register pulse may be derived for each frequency coincidence of the sweeping signal with a frequency in said spectrum, and gating means receptive to the register pulses and responsive to a frequency coincidence of the sweeping signal with the tuned frequency of said oscillator means, whereby a function of said gating means and therefore a limit of passing register pulses may be determined by the last-mentioned frequency coincidence.

4. Oscillator means according to claim 3, and including counting means responsive to register pulses passed by said gating means.

5. Oscillator means according to claim 4, and including counter-resetting means responsive to an operation of said frequency-sweeping means.

References Cited in the file of this patent

UNITED STATES PATENTS

| | | |
|---|---|---|
| 1,994,232 | Schuck | Mar. 12, 1935 |
| 2,248,442 | Stocker | July 8, 1941 |
| 2,295,615 | Tucker | Sept. 15, 1942 |
| 2,398,694 | Case | Apr. 16, 1946 |
| 2,436,235 | Sunstein | Feb. 17, 1948 |
| 2,476,840 | Colander | July 19, 1949 |
| 2,516,189 | Dinsmore | July 25, 1950 |
| 2,521,070 | Lindner et al. | Sept. 5, 1950 |
| 2,581,594 | MacSorley | Jan. 8, 1952 |
| 2,617,985 | Collins | Nov. 11, 1952 |
| 2,627,033 | Jensen et al. | Jan. 27, 1953 |
| 2,672,284 | Dickinson | Mar. 16, 1954 |

OTHER REFERENCES

An Instrument for Short-Period Frequency Comparisons of Great Accuracy," in the Journal of Institution of Electrical Engineers, January 1947, pages 38–41.